United States Patent
Gajek

(10) Patent No.: US 9,256,763 B2
(45) Date of Patent: Feb. 9, 2016

(54) METHOD AND SYSTEM FOR PROVIDING A PUBLIC KEY/SECRET KEY PAIR FOR ENCRYPTING AND DECRYPTING DATA

(71) Applicant: NEC EUROPE LTD., Heidelberg (DE)

(72) Inventor: Sebastian Gajek, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 46 days.

(21) Appl. No.: 14/016,564

(22) Filed: Sep. 3, 2013

(65) Prior Publication Data
US 2014/0177830 A1    Jun. 26, 2014

(30) Foreign Application Priority Data
Sep. 3, 2012    (EP) .................................... 12182810

(51) Int. Cl.
| | |
|---|---|
| H04L 29/06 | (2006.01) |
| G06F 21/62 | (2013.01) |
| H04L 9/08 | (2006.01) |
| H04L 9/30 | (2006.01) |
| H04L 9/32 | (2006.01) |
| G06F 21/31 | (2013.01) |

(52) U.S. Cl.
CPC .......... *G06F 21/6245* (2013.01); *G06F 21/316* (2013.01); *H04L 9/0866* (2013.01); *H04L 9/3073* (2013.01); *H04L 9/3271* (2013.01); *H04L 63/045* (2013.01); *H04L 63/062* (2013.01); *H04L 63/20* (2013.01); *H04L 2209/046* (2013.01)

(58) Field of Classification Search
CPC . G06F 21/316; G06F 21/6245; H04L 9/0866; H04L 9/0861; H04L 9/3073; H04L 9/3263; H04L 9/3271; H04L 2209/046; H04L 63/045; H04L 63/062; H04L 63/20
USPC .......................................................... 380/44
See application file for complete search history.

(56) References Cited

U.S. PATENT DOCUMENTS

| | | | | |
|---|---|---|---|---|
| 2005/0246771 | A1* | 11/2005 | Hunt et al. ........................ | 726/18 |
| 2006/0123238 | A1* | 6/2006 | Kacker et al. .................. | 713/185 |
| 2008/0263357 | A1* | 10/2008 | Boyen ............................ | 713/168 |
| 2011/0231899 | A1* | 9/2011 | Pulier et al. ....................... | 726/1 |
| 2012/0166792 | A1* | 6/2012 | Tan ................................ | 713/150 |

OTHER PUBLICATIONS

Luo, Song, Jianbin Hu, and Zhong Chen. "Ciphertext policy attribute-based proxy re-encryption." Information and Communications Security. Springer Berlin Heidelberg, 2010. 401-415.*

* cited by examiner

*Primary Examiner* — Yogesh Paliwal
(74) *Attorney, Agent, or Firm* — Young & Thompson

(57) ABSTRACT

A method for providing a public key/secret key pair for encrypting and decrypting data, wherein the public key of the public key/secret key pair and a master secret key are generated based on predefined policy information, and wherein the secret key of the public key/secret key pair is generated based on the generated master secret key and predefined attribute information. A method for accessing a system in an untrusted environment and a system for providing a public key/secret key pair for encrypting and decrypting data as well as a use for access control are also described.

13 Claims, 2 Drawing Sheets

METHOD AND SYSTEM FOR PROVIDING A PUBLIC KEY/SECRET KEY PAIR FOR ENCRYPTING AND DECRYPTING DATA

The present invention relates to a method for providing a public key/secret key pair for encrypting and decrypting data.

The present invention also relates to a method for accessing a system in an untrusted environment by a user according to one or more access policies.

The present invention further relates to a system for providing a public key/secret key pair for encrypting and decrypting data, preferably for performing with a method according one of the claims 1 to 7.

Although applicable to encrypting and decrypting data in general, the present invention will be described with regard to access control.

Although applicable to environments in general, the present invention will be described with regard to the use in untrusted and/or distributed environments.

In the past conventional computer topology was a 2-tier or 3-tier application, i.e. a client-server architecture. This client-server architecture was usually protected from any outside access meaning that only persons have access from inside, for example from within a company. Therefore an enforcement of accessing the server via clients was simple. The corresponding access policies for users were stored in clear and fetched from a server within a local network of the client-server architecture. When complying with the policies, clients were granted access to any service.

Due to the upcoming use of cloud-computing, since the costs of hosting and maintaining servers are high, service providers tend to rent computational resources, for example for computing comprehensive functions or storing large data sets, this simple access control is not up-to-date anymore: To provide privacy secure data and access data in general has to be transmitted and stored safely from or in the cloud.

However, one of the major problems is to ensure data confidentiality in such usually untrusted environments. When outsourcing data to a cloud provider, the outsourced data should be kept private. Examples for data to be kept private are internal communication data, e.g. e-mails, of a company, strategic papers of a company, economic situation related data or the like.

One of the conventional solutions to this problem is to encrypt all data to be outsourced to achieve a sufficient level of privacy. However depending on the amount of data to be encrypted and decrypted and to be transmitted from the cloud to a local system, for example to add further data in a database, time consuming encryption and decryption as well as network resources for transmitting the data to or receive it from the cloud are required. Since also access policies are data per se, these should also be kept private. Otherwise access policies may leak information when being accessible in clear text for an adversary. To handle access policies functional encryption schemes has been developed. However functional encryption requires a policy as input of the encryption procedure and therefore the policy must be available in clear.

Further conventional encryption schemes like identity-based encryption or predicate encryption also require clear text policies: For instance in an identity-based encryption one wishes to encrypt in a company—the master public key is a company key—a message for which one only knows the email address ID. The recipient has a secret key $SK_{ID}$ for his identity ID safeguarding that he may decrypt ciphertexts encrypted for his identity ID; otherwise he learns nothing. Therefore the email address must provided in clear text. To handle multiple attributes and enforce different operations on attributes the conventional technique of predicate encryption has been developed: instead of a simple string matching predicate encryption enables to express a Boolean function over a set of attributes, whereas the attributes must be provided in clear.

It is therefore an objective of the present invention to enable confidential storage of data, preferably policies, in particular of access policies.

It is a further objective of the present invention to enable enforcement of private access control.

It is a further objective of the present invention to satisfy security at least against eavesdroppers.

It is an even further objective of the present invention to provide an enhanced flexibility compared to conventional encryption/decryption schemes.

It is an even further objective of the present invention to provide strong anonymity properties avoiding leakage of data, in particular of policy data.

It is an even further objective of the present invention to enable performing of operations on encrypted data without the need to decrypt the encrypted data.

The aforementioned objectives are accomplished by a method of claim 1, a system of claim 9, a method of claim 8 and a use of a method according to claim 10.

In claim 1 a method for providing a public key/secret key pair for encrypting and decrypting data is described.

According to claim 1 the method is characterized in that
the public key of the public key/secret key pair and a master secret key are generated based on predefined policy information, and that
the secret key of the public key/secret key pair is generated based on the generated master secret key and predefined attribute information.

In claim 8 a method for accessing a system in an untrusted environment by a user according to one or more access policies is described.

According to claim 8 the method is characterized by the steps of
a) Encrypting challenge data, preferably in form of a random number, with a public key generated according to a method of at least one of the claims 1 to 7 and with policy information representing at least one of the access policies,
b) Decrypting the encrypted challenge data by the user with a secret key generated according to a method of at least one of the claims 1 to 7 with attribute information representing user access information for the system,
c) Checking whether the decrypted information matches the unencrypted challenge data and
d) Upon matching granting access to the system for the user.

In claim 9 a system for providing a public key/secret key pair for encrypting and decrypting data, preferably for performing with a method according to one of the claims 1 to 7 is described.

According to claim 9 the system is characterized by
setup means operable to generate the public key of the public key/secret key pair and a master secret key based on policy information, and
key generating means operable to generate the secret key of the public key/secret key pair based on the generated master secret key and attribute information.

In claim 10 a use of a method according to one of the claims 1 to 7 for access control to a system in an untrusted environment, preferably a system located in the cloud, is described.

Policy information may be preferably any kind of data representing a limitation in terms of decrypting. For example policy information may be data representing a certain salary level for users.

Attribute information may be preferably any kind of data, e.g. representing certain properties of users. For example attribute information may be data representing a salary level of a user, a certain confidentiality level or the like.

According to the invention it has been recognized that flexibility is greatly enhanced, since the secret keys are assigned with attribute information and the public key comprises policy information, preferably one or more policies, enabling multiple secret keys to decrypt a ciphertext if the attribute information associated with a secret key match the policy information.

According to the invention it has been further recognized that strong anonymity is provided since public keys leak no information about the policy information: given two public keys and an encryption with either of the public keys no efficient procedure can tell with which public key the ciphertext has been encrypted.

According to the invention it has been further recognized that enforcement of access control in untrusted environments is provided, i. e. neither the policy information nor attribute information leak information except e.g. that some party has the right to access the data or not in case of a policy being an access policy.

According to the invention it has been even further recognized that an untrusted party is enabled to identify legitimate users without learning about their privileges.

According to the invention it has been recognized that an easy implementation is provided, in particular in terms of computation and communication complexity.

In other words the present invention enables to keep the policy hidden by hiding the policy information in the public key and attribute information in a secret key. The policy is hidden in such a way that given two public keys it is hard for an efficient adversary to identify with which public key the encryption has been performed. Thus, the policies are kept confidential.

Further features, advantages and preferred embodiments are described in the following subclaims.

According to a preferred embodiment the attribute information is provided in form of a plurality of attributes, preferably based on predefined system parameters. When the attribute information is provided in form of attributes the attribute information can be provided with increased flexibility wherein the number of attributes can be adapted according to the needs of an operator for example. When the attribute information is based on predefined system parameters then the attribute information comprises information for describing an underlying system, e.g. access privileges of users for accessing certain data in the system. The attribute information can further be used for example to evaluate performance of the system etc.

According to a further preferred embodiment the policy information is provided in form of an evaluation function describing one or more predefined policies, preferably access policies. The evaluation function may be any kind of a function connecting for example predefined policies. The policies may be access policies so that the evaluation function uses for example user information or links different user information for evaluation: A result of an evaluation may for example be that when a user satisfies an access policy access is granted.

According to a further preferred embodiment the evaluation function is provided representing a Boolean expression. This enables a fast computation of the evaluation function saving computing resources for generating a public key and enables an easy implementation.

According to a further preferred embodiment the evaluation function is a predicate over conjunction, disjunction and/or threshold gates. This enables an even faster computation when only conjunction, disjunction and/or threshold gates are used to construct the evaluation function.

According to a further preferred embodiment the evaluation function is dependent on the attribute information. This enables to define access policies linking the attribute information via an evaluation function for matching with the policy information. Thus flexibility is enhanced.

According to a further preferred embodiment the generation of the public key and the generation of the secret key are performed by different parties, preferably having concurrent trust relationships. This even further enhances the flexibility when providing a public key/secret key pair since public and secret key or keys can be generated for example on different entities by different parties: A secret key may be distributed by a master authority entity providing the secret keys to the users whereas the public key may be generated by a service operator defining the policy. When having concurrent trust relationships an easier and faster implementation of an encryption and decryption method with a public/secret key pair is enabled.

There are several ways how to design and further develop the teaching of the present invention in an advantageous way. To this end it is to be referred to the patent claims subordinate to patent claim 1 on the one hand and to the following explanation of preferred embodiments of the invention by way of example, illustrated by the figure on the other hand. In connection with the explanation of the preferred embodiments of the invention by the aid of the figure, generally preferred embodiments and further developments of the teaching will be explained. In the drawings FIG. 1 shows a method according to a first embodiment of the present invention;

Figure 1:
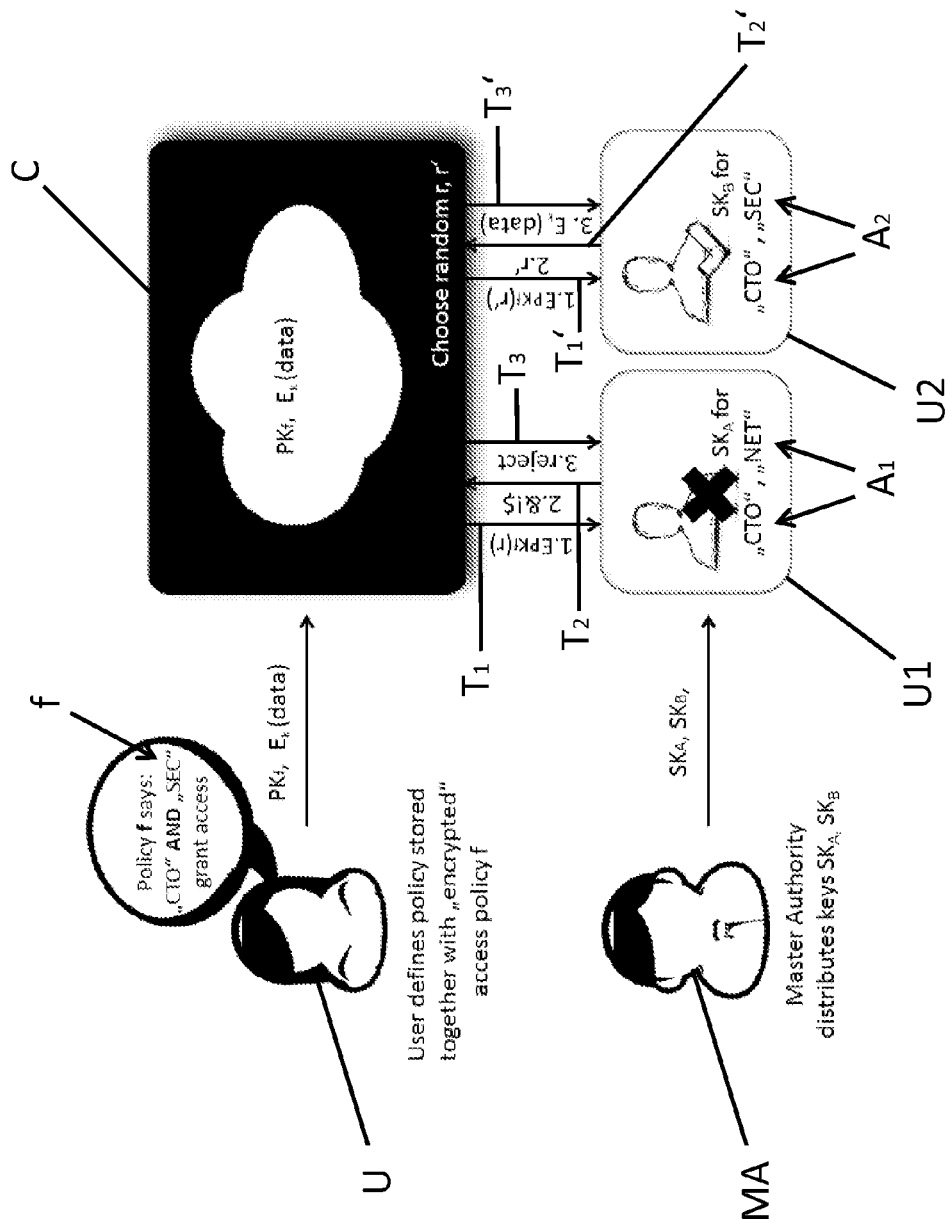
FIG. 1 shows a method according to a first embodiment of the present invention.

In FIG. 1 a private enforcing access protocol is shown. A user U1 has wrong credentials and does not get access to data in a cloud C. A user U2 has a correct secret key and may access the encrypted data.

In detail a user U has defined an access policy saying that when the attribute "CTO" and the attribute "SEC" are received then access is granted to the data. The cloud C should grant admissible users access to the stored data whereas unauthorized users should be rejected. In order to identify admissible users the cloud C runs an identification procedure after a public key with policy information $PK_f$ is provided and the data is encrypted $E_k$(data) with a key k and stored in the cloud C.

The identification procedure may be performed in the following way: a cloud C sends a random challenge r encrypted with the generated public key $PK_f$ including the access policy f to the users U1 and U2. This is denoted with reference sign T1 respectively T1'. An eligible user U2 that is one with a secret key $SK_B$ for the policy compliant attributes "CTO" and "SEC" can properly decrypt the challenge (denoted with reference sign T2') whereas the user U1 with the wrong secret key $SK_A$ learns nothing about the challenge (denoted with reference sign T2): Both users U1 and U2 send back the decrypted challenge in steps T2, T2' to the cloud C. The cloud C then sends a rejection (reference sign T3) back to the user U1 since the secret key $SK_A$ has the attribute information $A_1$ "CTO" and "NET" therefore not matching the policy f saying "CTO" AND "SEC". In contrast thereto the user U2 has the attribute information $A_2$ included in the secret key $SK_B$, namely "CTO" and "SEC". Therefore the policy f is matched, the user U2 can properly decrypt the challenge and when the decrypted challenge is sent in step T2' back to the cloud C, the cloud C responds in a step T3' with the encrypted data with key k, $E_k$(data). Therefore the user U2 has been granted access to the encrypted data $E_k$(data).

In more general terms a prover, here a user U1, U2 therefore proofs some knowledge of a secret key without revealing any information about the secret key.

The verifier, i.e. the cloud, may identify the prover but is incapable to impersonate the prover.

Figure 2:
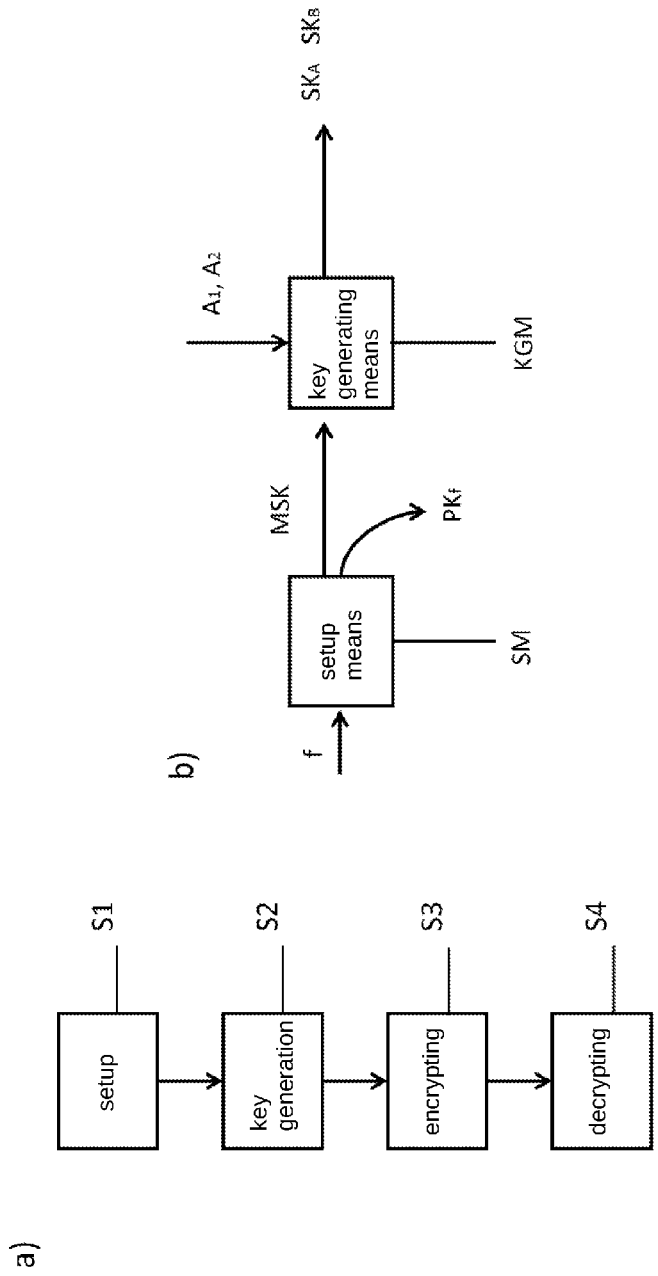
FIG. 2a shows a flow diagram for a method according to a second embodiment of the present invention.
FIG. 2b shows a system according to a third embodiment of the present invention.

FIG. 2a shows a flow diagram for a method according to a second embodiment of the present invention.

In FIG. 2a a so-called oblivious functional encryption scheme for a functionality f is shown and comprises the steps of setup, key-generation, encrypting and decrypting.

In a first step S1 a security parameter k and a description of an evaluation function f respectively a policy is input in a setup procedure. The setup procedure gene-rates and outputs a public key $PK_f$ for the policy f and a master secret key MSK.

In a second step S2 a key generation procedure is performed taking as input the generated master secret keys MSK and attribute information A and outputs the secret key $SK_A$.

In a third step S3 an encrypting procedure is performed taking as input the public key $PK_f$ and data in form of a message m to be encrypted. The encryption procedure outputs a ciphertext C.

To decrypt a ciphertext C a decryption procedure is performed taking as input the secret key $SK_A$ and the ciphertext C and outputs a message y. Since the oblivious function encryption must be correct, it is ensured that for all A, f and m and the public key/secret key pair $PK_f$, $SK_A$ output of a setup procedure and of a key generation procedure respectively, the output message y is dependent of the attribute information, the policy f and the message m with probability negligibly close to the value 1.

The policy f may be a predicate over AND, OR and/or THRESHOD gates, for example in form of a conjunctive normal form or disjunctive normal form formula. A functionality f then describes the decryption policy: if f (k)=1 then a correct message m is returned; otherwise a random value is returned.

In other words if the attribute information A accompanied with the secret key(s) match the policy f in terms of the predicate f, then the decryption procedure outputs a correct decryption of the encrypted message m. Otherwise a random message is outputted.

In further detail the setup procedure may take as input the total number of attributes |K| in the system and a description of a span program (M,ρ). M may be and l×n matrix and ρ:{1, . . . , l}→{$u_1$, . . . , $u_{|K|}$} may be a labeling function associating each row of the matrix M with an attribute {$u_i$}$_{1<i<|K|}$ of the system. Then a group B of prime order, a generator g of the group B, and |K| random group elements linked with the attributes are generated.

In the following the group elements are denoted as {$u_1$, . . . , $u_{|K|}$}∈. In addition, random blinding values a, c∈$Z_v$, $Z_p$ denotes the set of integers modulo p, and a random vector $\vec{v}$=($s_1, r_2, \ldots, r_l$)∈$Z_v$ are chosen where $s_1$ is the share of a linear secret sharing. Then the shares {$\lambda_i = M_i \vec{v}$}$_{i=1}^l$ for each row of Matrix M are computed. In addition, random vector $\vec{w}$=($w_1, \ldots, w_l$)∈$Z_v$ is chosen.

The public key $PK_F$ for evaluation function f is then set as $$g, g^a, e(g,g)^c,$$
$$S_1 = g^{s_1}, e(g,g)^{cs_1},$$
$$\{u_i\}_{i=1}^{|K|}, \{V_i = g^{\lambda_i a} u_{\rho(i)}^{-w_i}, W_i = g^{w_i}\}_{i=1}^l$$

wherein e:B→B denotes a bilinear mapping and p denotes the labeling function.

The master secret MSK is then
$g^c$

The key generation procedure takes as input the master secret MSK and a set U⊆{$u_1, \ldots, u_{|K|}$} of attributes. A blinding element d∈$Z_v$ at random is chosen and the secret key $SK_U$ is set as $$D = g^d, E = g^c g^{ad}, \{P_x = u_x^d\}_{\forall x \in U}, (M, \rho)$$

The encryption procedure takes as input the public key $PK_f$ and a message m to be encrypted. The value $s_2 \in Z_v$ is chosen at random and the ciphertext C is computed as $$C_1 = g^{s_2},$$
$$C_2 = g^{as_2},$$
$$C_3 = e(g,g)^{cs_1} \cdot e(g,g)^{cs_2} \cdot m = E(g,g)^{cs_0} \cdot m$$

The decryption procedure takes as input the secret key $SK_U$ and the ciphertext C. The value $g^{as_c}$ is computed and m=$C_3$/$g^{as_c}$ deduced.

To compute $g^{as_c}$ the following steps may be performed: Suppose U⊆A satisfies the access policy. Then there exists an I⊆{1, . . . , l} such that I={uρ(i)∈U} is the set of row indices associated with the attributes. There also exist constants {$\beta_i \in_v$}$_{i \in I}$ such that if {$\lambda_i$}$_{i \in I}$ are valid shares of secret $s_1$, then $\Sigma_{i \in I} \beta_i \lambda_i = s_1$. According to the definition of a linear secret sharing scheme there must exist such constants $\beta_i$ and they are efficiently computable.

The decryption procedure then computes $$e(S_1 C_1, E)/e(C_2, D) \cdot \prod_{i \in I}(e(V_i, D) \cdot e(W_i, F_{\rho(i)}))^{\beta_i} =$$

$$\frac{e(g^{s_1} g^{s_2}, g^c g^{ad})}{e(g^{as_2}, g^d) \cdot \prod_{i \in I}(e(g^{\lambda_i a} u_{\rho(i)}^{-w_i}, g^d) \cdot e(g^{w_i}, u_{\rho(i)}^d))^{\beta_i}} = e(g,g)^{cs_0}$$

FIG. 2b shows a system according to a third embodiment of the present invention.

In FIG. 2b setup means SM are shown which take as input a description of a policy f and generate and output the public key $PK_f$ of the public key/secret key pair as well as a master secret key MSK. In the master secret key MSK is provided to key generating means KGM. Further attribute information $A_1$, $A_2$ are provided to the key generating means KGM. The key generating means KGM then generate the secret keys $SK_A$, $SK_B$ of the public key/secret key pair based on the generated master secret key MSK and the attribute information $A_1, A_2$ so that a public key/secret key pair is provided for encrypting and decrypting data.

In general the present invention is therefore not limited to one secret key with attributes. The term public key/secret key pair includes for example one public key for a policy f and a plurality of secret keys based on the master secret key and different secret keys with different attributes. Even further the term public key/secret key pair is not limited one public key with one policy. The public key may also be provided with a plurality of different policies as well as a plurality of public keys may each having one or more different policies. Therefore, the term public key/secret key pair refers also to a plurality of public keys and/or a plurality of secret key for encrypting and decrypting data.

Further the present invention is not limited to environments in form of clouds: outsourced environments or untrusted environments may also be sensors, smart-cards, SIM cards or the like.

In summary the present invention enables to manage access control on encrypted policies named herein as oblivious functional encryption. In particular a decryption of a function F (attribute information A; policy f, message m) over a plain text (policy f, message m) is decrypted. For example when an image (f, m) is encrypted then the function F could compute a modified image with some sanitized parts. A use case for example is Google Maps where privacy laws may require blurring some parts of the images, for example faces of persons in the image.

The present invention has inter alia the following advantages: data, preferably policies, in particular access policies, can be stored confidentially. Another advantage is that private access control can be easily enforced. An even further advantage is that a simple and efficient identification procedure is provided enabling an untrusted party to identify illegitimate users without learning about the privileges. For example a service provider is able to enforce access control without revealing the corresponding access control policy. This is a great advantage in outsourced environments where a service provider is considered as honest but curious pursuing the goal of revealing most information about the stored data.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for providing a public key/secret key pair for encrypting and decrypting data, comprising:
by means of a computer device, generating and storing in a memory available to said computer device a public key of the public key/secret key pair and a master secret key based on predefined policy information stored in the memory of said computer device, the public key being generated based on a security parameter and the predefined policy information; and
generating and storing in the memory of said computer device a secret key of the public key/secret key pair based on the generated master secret key and predefined attribute information stored in the memory of said computer device.

2. The method according to claim 1, wherein the predefined attribute information is provided in form of a plurality of attributes.

3. The method according to claim 2, wherein the plurality of attributes is based on predefined system parameters.

4. The method according to claim 1, wherein the predefined policy information is provided in form of an evaluation function describing one or more predefined policies.

5. The method according to claim 4, wherein the evaluation function is provided representing a Boolean expression.

6. The method according to claim 4, wherein the evaluation function is a predicate over conjunction (AND), disjunction (OR) and/or threshold (TRESHOLD) gates.

7. The method according to claim 4, wherein the evaluation function is dependent on the predefined attribute information.

8. The method according to claim 4, wherein the one or more predefined policies are access policies.

9. The method according to claim 1, wherein the generation of the public key and the generation of the secret key are performed by different parties, preferably having concurrent trust relationships.

10. A method for permitting access by a user to a system composed of computer devices in communication with each other in an untrusted environment according to one or more access policies, comprising the steps of:
by way of a first computer of said system, reading unencrypted challenge data from a memory of said computer and encrypting said unencrypted challenge data with a public key generated according to the method of claim 1 and with policy information representing at least one of one or more access policies, thereby to produce and store in the memory of the first computer an encrypted challenge data, and sending said encrypted challenge data to a second computer;
by way of the second computer, receiving and decrypting the encrypted challenge data with a secret key, previously stored in a memory of the second computer and generated with attribute information representing user access information for the system, to produce and store in the memory of the second computer a decrypted information, and sending the decrypted information to the first computer;
at the first computer, receiving the decrypted information and checking whether the received decrypted information matches the unencrypted challenge data stored in the memory of the first computer; and
upon a successful match of the decrypted information and the unencrypted challenge data, granting access to the second computer.

11. The method according to claim 10, wherein the generated and stored challenge data is in a form of a random number.

12. A system for providing a public key/secret key pair for encrypting and decrypting data, comprising:
at least one computer device operable and configured to generate and store in a memory available to said computer device a public key of the public key/secret key pair and a master secret key based on policy information stored in the memory of said computer device, the public key being generated based on a security parameter and the policy information; and
the at least one computer device operable and configured to generate and store in a memory available to said computer device a secret key of the public key/secret key pair based on the generated master secret key and attribute information stored in the memory of said computer device.

13. A method for controlling access to a system composed of computer devices in communication with each other in an untrusted environment, comprising:
- by means of a computer device, generating and storing in a memory available to said computer device a public key of the public key/secret key pair and a master secret key based on predefined policy information stored in the memory of said computer device, the public key being generated based on a security parameter and the predefined policy information;
- generating and storing in the memory of said computer device a secret key of the public key/secret key pair based on the generated master secret key and predefined attribute information stored in the memory of said computer device; and
- sending challenge data encrypted with the public key and the predefined policy information to a user computer device seeking access to the system.

* * * * *